Sept. 12, 1961 B. C. MATHEWS 2,999,346
VARIABLE DISCHARGE CROP REAPER AND CHOPPER
Filed July 7, 1959 2 Sheets-Sheet 1
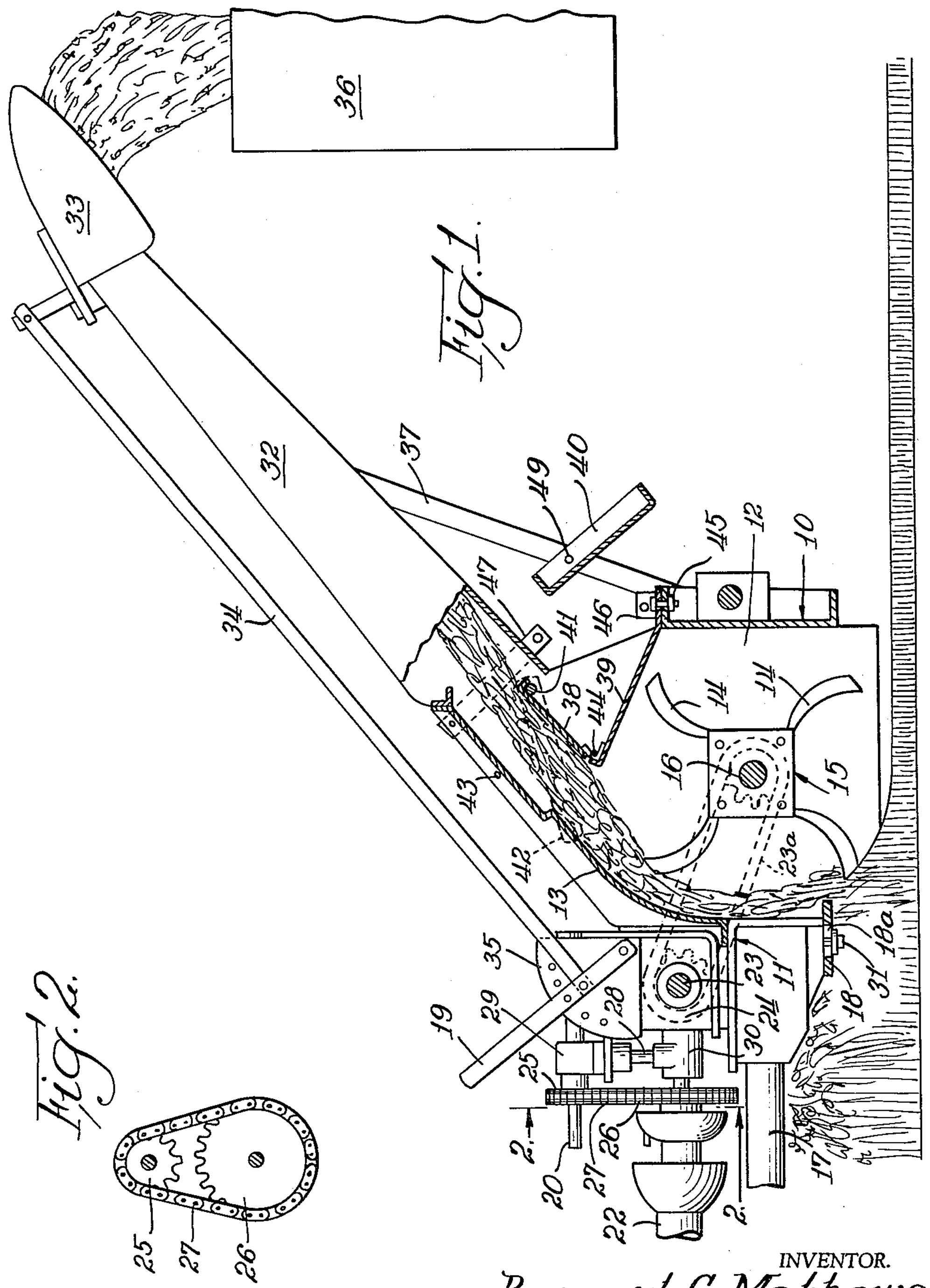
INVENTOR.
Bernard C. Mathews
BY
Eugene M. Giles Att'y VARIABLE DISCHARGE CROP REAPER AND CHOPPER
Filed July 7, 1959 2 Sheets-Sheet 2
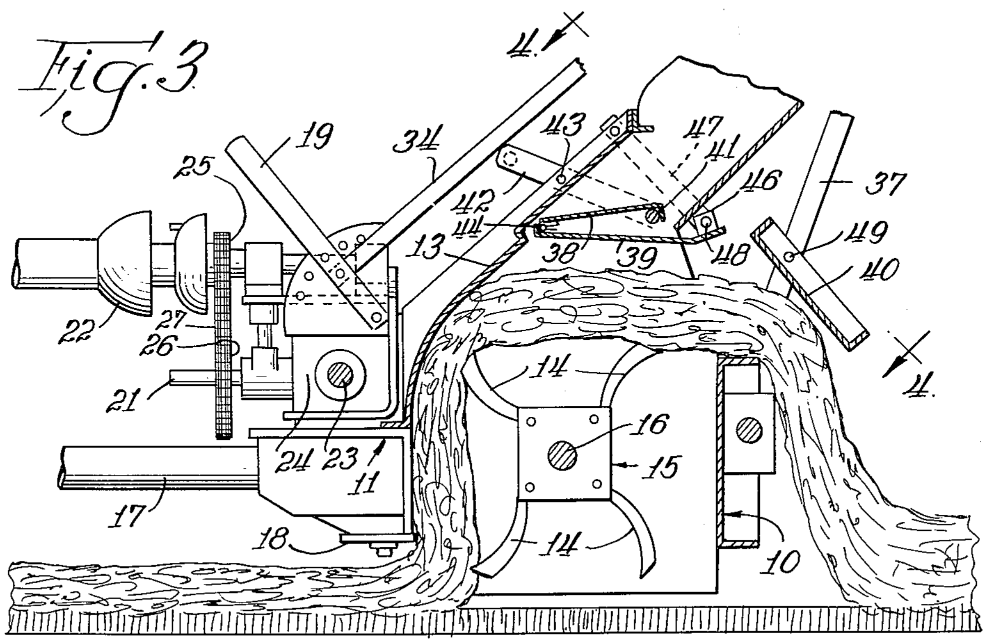
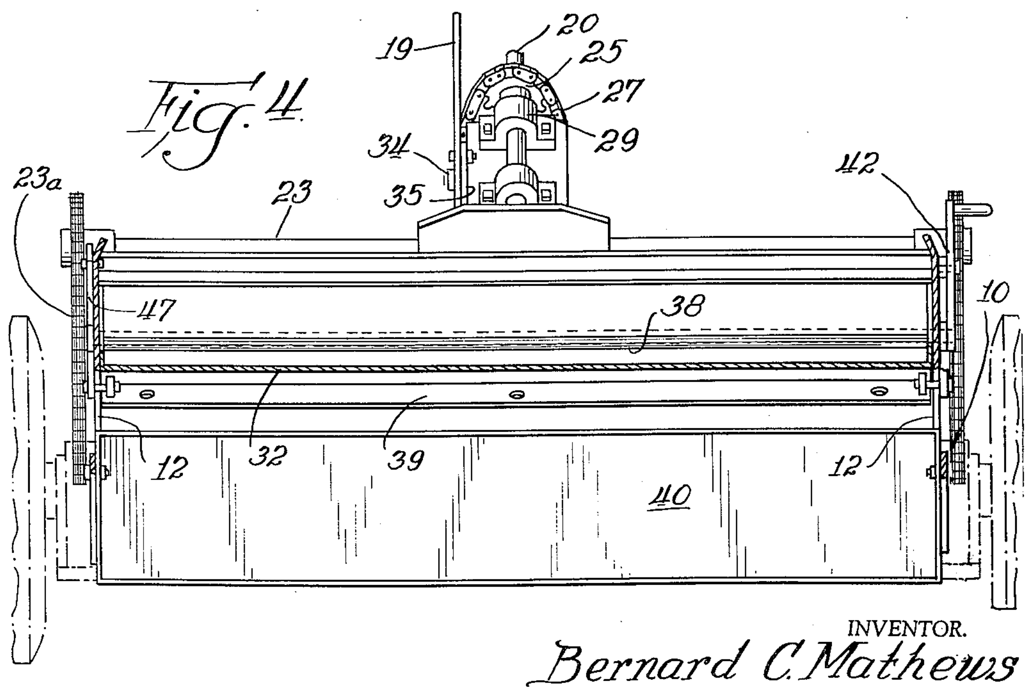
INVENTOR.
Bernard C. Mathews
BY
Eugene M. Giles Att'y.

United States Patent Office 2,999,346

Patented Sept. 12, 1961

2,999,346

VARIABLE DISCHARGE CROP REAPER AND CHOPPER

Bernard C. Mathews, Rte. 4, Huntley, Ill.

Filed July 7, 1959, Ser. No. 825,435
10 Claims. (Cl. 56—1)

My invention relates to a crop reaping and chopping device having a discharge section selectively adjustable to spread the crop on the ground or to load it in a suitable holder, and is a continuation-in-part of my co-pending application Serial No. 654,288, filed April 22, 1957, for "Crop Reaper and Chopper," now abandoned.

As the operations connected with harvesting of crops become more mechanized, it becomes increasingly important that each piece of equipment be as versatile as practical. Thus if a reasonably familiar type of harvesting device can be modified in design to enable it to perform more functions more efficiently, it enhances its value and utility to the modern day farmer.

The principal object of my invention is to design an improved crop reaper and chopper which can be used not only to mow and chop a crop, such as hay, but which can spread the crop on the ground during a first pass for drying and conditioning and which can then pick up and load the crop in a subsequent pass.

It is another object of my invention to develop such a device which can be adjusted simply and quickly to switch from mowing to chopping and from spreading to loading.

It is a further object of my invention to develop a device of this character which is simple and economical in design and easy to adjust and operate, these and other objects being accomplished as hereinafter described, reference being had to the accompanying drawing in which:

FIG. 1 is a side view of my crop reaping and chopping device with portions removed to show the selectively variable discharge means embodying my invention in the "load" position;

FIG. 2 is a view on the line 2—2 of FIG. 1;

FIG. 3 is a side view similar to FIG. 1 showing the selectively variable discharge means in the "spread" position; and FIG. 4 is a view on the line 4—4 of FIG. 3.

Referring now to the drawing, the crop reaper and chopper to which my invention relates is shown in the present embodiment as a two wheeled device adapted to be pulled and powered by a tractor of any type ordinarily used on a farm. The wheels, shown by the dotted lines in FIG. 4, are disposed at opposite sides of the device and serve to support it as it is pulled through the field by the tractor.

The main structural members of the device are a heavy transverse channel iron designated generally by the reference numeral 10 and a transverse angle iron spaced forwardly therefrom in parallel relation thereto, designated by the reference numeral 11. The members 10 and 11 are rigidly secured at their respective ends to heavy plates forming end walls 12. The end walls 12 and a transverse panel 13 secured thereto and to the angle iron 11 combine to form a housing in which the mowing and chopping facilities are enclosed.

The mowing and chopping facilities, as disclosed in my co-pending application Serial No. 654,288, comprise a plurality of cutter arms 14 projecting substantially radially in spaced relation along a pivoted rotor 15 which extends from one end of the housing to the other and has a center shaft 16 journaled at its respective ends in bearings mounted on the end walls 12. The mowing and chopping facilities are adapted to be rotated in a clockwise direction as viewed in FIGS. 1 and 3.

A front end assembly mounted on the angle iron 11 includes a drawbar 17, an adjustable cutter blade 18, a two-speed drive mechanism, and a spout control lever 19.

The drawbar or tongue 17 may be of any familiar type ordinarily employed with tractor-operated farm machinery and is connected at one end to the front end assembly on the angle iron 11. The opposite end (not shown) is provided with any suitable means for connection with a tractor.

The drive mechanism has an upper drive connection 20 and a lower drive connection 21 to either of which a conventional power-take-off member 22 from a tractor may be selectively connected. The lower drive connection 21 to which the power-take-off member 22 is coupled in FIG. 1 operates a transverse drive 23 through suitable gears in a gear box 24. The drive shaft 23 is provided with suitable drive means, such as a chain drive 23[a] at either or both ends connected to the center shaft 16, to drive the rotor 15. When the power-take-off member 22 is coupled to the lower drive connection 21, as in FIG. 1, the rotor 15 is driven at high speed.

The upper drive connection 20 to which the power-take-off member 22 is coupled in FIG. 2 has a sprocket 25 of relatively small diameter mounted thereon. A large diameter sprocket 26 is mounted on the lower drive connection 21. A link chain 27 engages both sprockets 25 and 26 so that torque applied to the upper drive connection 20 drives the drive shaft 23 at reduced speed compared with the same torque applied to the lower drive connection 21. A ratio of 2 to 1 providing two revolutions of shaft 20 to each revolution of the shaft 21 is suitable.

A chain tightener 28 interposed between and threadably engaged with the bearings 29 and 30 of the respective drive connections 20 and 21 is oppositely threaded at its respective ends so that by turning in one direction or other it increases or reduces the distance between the sprockets 25 and 26 so as to tighten or loosen the chain 27.

The transverse cutter blade 18 is secured to the front end assembly by means of spaced bolts 31, the blade 18 having transverse slots as indicated at 18[a] through which the bolts extend so that the blade 18 can be positioned closer to or further from the path of rotation of the cutter blades 14 as desired.

A loading chute 32 is mounted on the housing formed by the end walls 12 and the transverse panel 13, the chute 32 being a tapered sheet metal enclosure of generally rectangular cross-section of maximum width at its lower end where it is mounted on said housing and extends from end to end thereof. The chute 32 is tapered to a minimum width at its upper end where an adjustable spout 33 is mounted. The spout 33 is held in any selected position to which it may be adjusted by means of a connecting rod 34 attached to the spout control lever 19 which in turn may be secured at any of several positions on a quadrant 35 on the front end assembly. The spout 33 may thus be adjusted to the preferred position for discharging into a wagon 36 as shown in FIG. 1.

The loading chute 32 is supported with respect to the channel iron frame member 10 by means of spaced braces 37 at the respective sides of the duct 32 secured at their lower ends to the channel iron 10.

The variable discharge means for selectively directing the flow of crop material either upwardly through the spout 33 (FIG. 1) or alternatively for diverting such crop material downwardly to be spread on the ground (FIG. 3) comprises a retractable baffle having an upper section 38 and a lower section 39 disposed at the inflow end of the chute 32 and a deflector plate 40 spaced rearwardly therefrom. The deflector plate 40 is pivotally secured by bolts 49 at its opposite ends on the braces 37 for adjustment to selected positions of angularity.

The upper section 38 of the foldable baffle is an elongated panel disposed transversely at the base of the chute 32 and secured along one edge to a shaft 41 which is supported at its respective ends in the side walls of the chute 32. The respective ends of the shaft 41 where they protrude from the chute 32 are provided with levers 42 adapted to permit manipulation of the upper section 38 from the position shown in FIG. 1 to the position shown in FIG. 3. In the latter position, the levers 42 may be bolted as shown at 43 to corresponding holes provided in the extended edges of the side walls 12.

Along the edge remote from the shaft 41, the upper section 38 is provided with a transverse hinge 44 to which an edge of the lower section 38 is secured. The opposite edge of the lower section 39, in the position shown in FIG. 1, is secured to the channel iron 10 by means of bolts 45. In the position shown in FIG. 3, the free edge of the lower section 39 is disengaged from the channel iron 10 and is held in retracted position by means of upturned ears 46 at the respective ends of the section being bolted to the projecting ends of straps 47 mounted on the opposite sides of the chute 32 as shown at 48 in FIG. 3. In this position, the lower section 39 is disposed diagonally across the inflow end of the chute 32, thus serving to deflect or divert the flow of crop material scooped up and flung tangentially by the rotor 15 toward the chute 32.

To further deflect the flow of crop material thus diverted by the foldable baffles 38—39, the deflector plate 40 is set at any desired angle by releasing and resetting the bolts 49 by means of which the deflector plate 40 is secured to the braces 37.

When the crop reaper and chopper thus described is to be used either for mowing or for mowing and chopping, the retractable baffle 38—39 and the deflector plate 40 are set in the positions shown in FIG. 3, and the device is then connected to a tractor or other pulling means by means of the drawbar 17. For simple mowing, where low speed operation of the rotor 15 is desired, the upper drive connection 20 may be connected to the power-take-off member 22 of the tractor or to any other suitable source of power. The low speed serves to cut and crimp the hay or other crop, leaving it in relatively long lengths without too much chopping. The crimping causes the hay or other crop to pile up loosely on the ground so as to permit air circulation therethrough and rapid drying.

For mowing and chopping, where higher speed operation of the rotor 15 is required, the power-take-off member 22 would be engaged with the lower drive connection 21 as shown in FIG. 1. The rapid rotation of the rotor 15 serves both to chop the hay or other crop into short lengths and also imparts sufficient velocity to the chopped material to impel it upwardly through the spout 33.

When the foldable baffle 38—39 and the deflector plate 40 are set in this manner, crop material picked up and cut or chopped by the blades 14 of the rotor 15 is flung toward the chute 32 with a velocity determined by the speed of rotation of the rotor 15. The lower section 39 of the retractable baffle serves both to block entry of the crop material into the chute 32 and to divert its flow toward the deflector plate 40. The deflector plate 40 is set to further divert the flow of cut or chopped crop material downwardly toward the ground behind the channel iron 10 as shown by the irregular flow lines in FIG. 3.

It has been found that many crops such as hay, grass silage, green feed, and the like can be improved in harvesting by preliminary cutting and in some instances, chopping, followed by loose spreading of the cut crop on the ground for aerating and drying prior to loading and storing. With my improved crop reaper and chopper, it is possible to perform this step efficiently with the same machine which subsequently picks up and loads the cut crop for storage.

For loading the crop, either as it is cut or by picking it off the ground after preliminary cutting and chopping as previously described, the retractable baffle 38—39 is disengaged from its retracted position and secured in the position shown in FIG. 1. This is done by disconnecting the upturned ears 46 from the projecting ends of the straps 47, by removing the bolts at 43 from the lever 42, and by then securing the free edge of the lower section 39 to the top of the channel iron 10. The power-take-off member 22 may be connected either to the upper drive connection 20 or the lower drive connection 21, but preferably to the latter in order to operate the rotor 15 at maximum speed so as to impart greater velocity to the crop material either being cut or picked up from the ground for loading. It will be understood, of course, that the cutting bar 18 may be adjusted toward or away from the rotor 15 as desired in these various operations.

While I have shown and described my invention in a preferred form, I am aware that various modifications can be made therein without departing from the spirit of my invention, the scope of which is determined by the appended claims.

I claim:

1. A harvesting device comprising an elongated housing portably supported to travel sidewise over the ground and provided with an entrance thereto at the bottom thereof facing downward toward the ground and exit means therefrom at the top and a centrifugal impeller therein all of which are elongated in the direction of the length of and are substantially co-extensive with the length of the housing, the centrifugal impeller being elongated axially and interposed between the entrance and exit means and rotatable about its axis in a direction to remove ground borne material from the ground at the entrance and impel the removed ground borne material upwardly in the housing at the front thereof and rearwardly in the housing at the top thereof and discharge it centrifugally from the housing through the exit means, the exit means being provided with exit selecting means which is disposable in two optional positions providing selective centrifugal discharge of the removed ground borne material from the housing in two different optional directions in one of which said optional positions the impeller discharges the removed ground borne material centrifugally over the top of the exit selecting means in a direction generally upward from the housing and in the other of which said two optional positions the impeller discharges the removed ground borne material underneath the exit selecting means in a direction generally rearward from the housing.

2. A harvesting device as defined in claim 1 in which the exit means comprises two exits which are consecutively distant from the housing entrance along the path of travel of the removed ground borne material from the entrance to the exits.

3. A harvesting device as defined in claim 2 in which the centrifugal impeller is provided with power transmission means by which it is rotatable and the power transmission means has change speed mechanism connected therewith providing selectable high and low speeds of rotation of the impeller and the impeller is rotatable thereby at the high speed for discharge of the removed ground borne material upward from the housing and at the low speed for discharge of the removed ground borne material rearward from the housing.

4. A harvesting device as defined in claim 1 in which means is provided in the path of centrifugal discharge of removed ground borne material rearward from the housing by which the rearwardly discharged material is redirected downwardly toward the ground.

5. A harvesting device comprising an elongated housing portably supported to travel sidewise over the ground and provided with an entrance thereto at the bottom thereof and two exits therefrom at the top and a centrifugal impeller therein all of which are elongated in the direction of the length of and are substantially co-extensive with the length of the housing, the centrifugal impeller being elongated axially and interposed between the entrance and the two exits and rotatable about its axis in a direction to remove ground borne material from the ground at the entrance and impel the removed ground borne material upwardly in the housing at the front thereof and rearwardly in the housing at the top thereof and discharge it centrifugally from the housing through a selected one of said two exits, the said exits having a selector extending therealong and disposable in two different optional positions in which it projects into the housing to different respective places therein in one of which said positions the impeller discharges the removed ground borne material centrifugally over the top of the exit selector in a direction generally upward from the housing and in the other of which said two positions the impeller discharges the removed ground borne material underneath the exit selector in a direction generally rearward from the housing.

6. A harvesting device as defined in claim 5 in which the selector is composed of two sections hinged to one another for disposition in divergent relation to one another in the position in which the impeller discharges the removed ground borne material centrifugally over the top of the exit selector.

7. A harvesting device comprising an elongated housing portably supported to travel sidewise over the ground and provided with an entrance thereto at the bottom thereof facing downward toward the ground and exit means therefrom at the top and a centrifugal impeller therein all of which are elongated in the direction of the length of and are substantially co-extensive with the length of the housing, the centrifugal impeller being elongated axially and interposed between the entrance and exit means and rotatable about its axis in a direction to remove ground borne material from the ground at the entrance and impel the removed ground borne material upwardly in the housing at the front thereof and rearwardly in the housing at the top thereof and discharge it centrifugally from the housing through the exit means, and a diverter at the exit means optionally disposable in two positions for selective centrifugal discharge of the removed ground borne material by the impeller selectively through upper and lower portions of the exit means in a direction generally upward from the housing through the upper portion of the exit means and in a direction generally rearward from the housing through the lower portion of the exit means, the diverter having top and bottom faces which are disposed convergently toward one another in one of said positions with the bottom face thereof obstructing the lower portion of the exit means and the top face defining the bottom of a path along which the impeller discharges the removed ground borne material through the upper portion of the exit.

8. A harvesting device comprising an elongated housing portably supported to travel sidewise over the ground and provided with an entrance thereto at the bottom thereof facing downwardly toward the ground and two adjoining exits therefrom at the top and a centrifugal impeller therein all of which are elongated in the direction of the length of and are substantially co-extensive with the length of the housing, the centrifugal impeller being elongated axially and interposed between the entrance and exit and rotatable about its axis in a direction to remove ground borne material from the ground at the entrance and impel the removed ground borne material upwardly in the housing at the front thereof and rearwardly in the housing at the top thereof and discharge it centrifugally from the housing selectively through said exits, one of said exits being communicable with the lower end of a chute which leads upwardly therefrom and is substantially co-extensive in width at its lower end with the length of the exit and tapers upwardly therefrom to a narrow width discharge opening therefrom at its upper end, the chute having a wall therealong at opposite sides of the lower end of which the said exits are disposed, said wall having a selector at the lower end thereof and disposable in two optional positions in one of which the impeller discharges the removed ground borne material centrifugally across the selector at one side thereof in a direction generally upward through the said one of said exits into the chute and in the other one of said two positions the impeller discharges the removed ground borne material centrifugally across the selector at the opposite side thereof in a direction generally rearward from the housing.

9. A harvesting device as defined in claim 8 in which the selector in one position thereof has the opposite sides converging toward one another in a direction away from the lower end of the said wall of the chute.

10. A harvesting device as defined in claim 8 in which the selector is composed of two sections which are hinged to one another and in one of its optional positions the centrifugal impeller discharges the removed ground borne material across one side of one of the said sections to one of the exits and the other section is disposed in front of and closes the other exit.

References Cited in the file of this patent

UNITED STATES PATENTS

| | | |
|---|---|---|
| 2,827,745 | Taylor | Mar. 25, 1958 |
| 2,906,085 | Lundell | Sept. 29, 1959 |